(12) United States Patent
Moussa et al.

(10) Patent No.: US 8,947,217 B2
(45) Date of Patent: Feb. 3, 2015

(54) HUMAN MACHINE INTERFACE FOR AN AUTOMOTIVE VEHICLE

(71) Applicant: Delphi Technologies, Inc., Troy, MI (US)

(72) Inventors: Hassan Moussa, Illkirch (FR); Ralph Flesch-Hild, Illkirch (FR)

(73) Assignee: Delphi Technologies, Inc., Troy, MI (US)

( * ) Notice: Subject to any disclaimer, the term of this patent is extended or adjusted under 35 U.S.C. 154(b) by 169 days.

(21) Appl. No.: 13/744,463

(22) Filed: Jan. 18, 2013

(65) Prior Publication Data

US 2013/0187770 A1 Jul. 25, 2013

(30) Foreign Application Priority Data

Jan. 20, 2012 (EP) ..................................... 12151995

(51) Int. Cl.
*B60Q 1/00* (2006.01)
*B60R 1/00* (2006.01)
*G02B 27/01* (2006.01)
*G02B 26/08* (2006.01)

(52) U.S. Cl.
CPC .............. *B60R 1/00* (2013.01); *G02B 27/0101* (2013.01); *G02B 26/0833* (2013.01)
USPC ....................... 340/425.5; 345/204

(58) Field of Classification Search
CPC ........... B60R 1/00; B60K 35/00; B60K 37/02
USPC ....................................................... 340/425.5
See application file for complete search history.

(56) References Cited

U.S. PATENT DOCUMENTS

| | | | |
|---|---|---|---|
| 6,043,937 | A | 3/2000 | Hudson et al. |
| 7,414,621 | B2 * | 8/2008 | Yavid et al. .................... 345/204 |
| 7,972,014 | B2 * | 7/2011 | Hung et al. ...................... 353/69 |
| 2009/0174632 | A1 * | 7/2009 | Hajjar et al. .................... 345/81 |
| 2011/0122101 | A1 * | 5/2011 | Kurozuka ...................... 345/204 |
| 2011/0140873 | A1 | 6/2011 | Staehlin et al. |

OTHER PUBLICATIONS

European Search Report dated Jun. 20, 2012.
(Continued)

*Primary Examiner* — Kerri McNally
(74) *Attorney, Agent, or Firm* — Lawrence D. Hazelton

(57) ABSTRACT

A human machine interface (HMI) for an automotive vehicle comprises an instrument cluster and at least one head-up display for displaying information. The HMI includes at least one picture generation unit, each of which includes a laser for generating a modulated laser beam and a micro-electromechanical scanning minor arranged in the optical path of the laser beam for sweeping the laser beam over a diffuser in a two-dimensional Lissajous pattern. The HMI further comprises a central control unit that may be interfaced with a vehicle's on-board computer and/or another on-board device. A processor of the central control unit is configured to determine the pictures to be generated by the at least two picture generation units and to calculate, for each picture generation unit, the two-dimensional Lissajous pattern and the modulation of the at least one laser beam, the combination of which results in the respective picture to be displayed.

10 Claims, 8 Drawing Sheets

(56) References Cited

OTHER PUBLICATIONS

Volpi, et al: "System study for a head-up display based on a flexible sensor interface"; Jan. 1, 2010, Sensors and Microsystems: AISEM 2009 Proceedings; [Collection of Most of the Papers Presented at the 14th Italian Conference on Sensors and Microsystems; University of Pavia, Held From Feb. 24 to 26, 2009], Dordrecht: Springer, NL. pp. 413 to 417. XP009160363, ISBN: 978-90-481-3605-6.

* cited by examiner

HUMAN MACHINE INTERFACE FOR AN AUTOMOTIVE VEHICLE

CROSS-REFERENCE TO RELATED APPLICATION

This application claims the benefit under 35 U.S.C. §371 of European Patent Application EP 12151995.3 filed Jan. 20, 2012, the entire contents of which is hereby incorporated by reference herein.

TECHNICAL FIELD OF INVENTION

The present invention generally relates to a human machine interface for an automotive vehicle (such as, e.g. a car), in particular, a human machine interface that comprises an instrument cluster and one or more head-up displays for optically displaying information

BACKGROUND OF INVENTION

The complexity of vehicle electronics has significantly increased during the last years. A large number of new functionalities require a significant amount of information to be optically displayed to the driver. This information is typically conveyed via a plurality of completely independent devices, such as the instrument cluster (behind the steering wheel), the center console (i.e. the control-bearing surfaces in the center area of the vehicle interior front beginning in the dashboard and continuing beneath it) and, increasingly often in modern cars, a head up display. With the exception of the center console, each of these information-conveying devices is typically configured for information of the driver only.

A conventional instrument cluster is shown in U.S. Design Pat. No. 637,128. In a conventional instrument cluster, information is provided to the driver by means of lamps or LEDs (for illuminating predefined warnings and pictograms), analog gauges and counters (using stepping motors), segment LCDs or even color LCD screens.

The usage of more versatile displaying devices, such as e.g. a thin film transistor-liquid crystal display (TFT-LCD) in the instrument cluster involves a number of challenges, in particular, costs, quality and reliability issues, system compatibility and scalability across a given range of products.

As concerns the head-up display, devices currently available on the market are offered as a package including the electronics, the relay optics, the picture generation unit and, in some cases, mechanisms enabling the deployment of the combiner. A head-up display of this type is disclosed in patent application WO2007/107515 A1. Head up displays of this type require a large packaging to be integrated under the dashboard. For reasons of available space, head-up displays have therefore been arranged only in front of the driver (behind—as seen from the driver—the instrument cluster). The viewing area of a typical head-up display is hence limited to a small area directly in front of the driver, which as a consequence limits the quantity of information to be displayed. Furthermore, the information displayed by conventional head-up displays can only be viewed by the driver, despite the benefits, not in terms of distraction but of safety, of displaying the information to the other passengers in the car.

Turning to the center console, currently available displays are limited in terms of size. Furthermore, the most elaborate display devices available to date have a flat screen, which restricts the design possibilities. There is interest in the automotive industry for a display device that can display information on a curved surface of the center console.

SUMMARY OF THE INVENTION

It is an object of the present invention to provide a more versatile human machine interface for an automotive vehicle that can be adapted comparatively easily for different types of vehicles. This object is achieved by a human machine interface as claimed in claim 1.

According to the invention, a human machine interface for an automotive vehicle comprises an instrument cluster and at least one head-up display for displaying information to a vehicle driver and, optionally, to one or more passengers. The instrument cluster and the at least one head-up display together comprise at least two picture generation unit (PGU). These are advantageously arranged in different areas of the human machine interface. Each picture generation unit includes at least one laser for generating at least one laser beam that is modulated in time and a micro-electromechanical scanning minor arranged in the optical path of the laser beam for sweeping the at least one laser beam over a diffuser in a two-dimensional Lissajous pattern. Each picture generation unit thus generates on the diffuser a picture resulting from the combination of the modulation of the at least one laser beam in time and the two-dimensional Lissajous pattern. The human machine interface further comprises a central control unit. The central control unit is configured for being interfaced with a vehicle's on-board computer and/or one or more devices on-board the vehicle for receiving information to be displayed in form of a picture. The central control unit includes a processor operatively connected with the at least two picture generation units. The processor is configured to determine the pictures to be generated by the at least two picture generation unit that contain the information to be displayed and to calculate, for each picture generation unit, the two-dimensional Lissajous pattern and the modulation of the at least one laser beam, the combination of which results in the respective picture to be displayed.

In the context of the present disclosure, the term "picture" designates any kind of image perceptible by the human eye susceptible of conveying information, in particular symbols, pictograms, letters, numbers, graphs, gauges, cursors, etc.

As will be appreciated, the processor of the central control unit is configured to calculate the Lissajous pattern and the laser beam modulation of each picture generation unit in a centralized manner. Computational power can thus be concentrated in the central control unit, which enables its most efficient use. Microprojection devices using micro-electromechanical scanning mirrors currently available on the market include the processor implementing all the image algorithms and color management in the same package as the laser or MEMS minor drivers. Using such existing devices in the car interior in order to display information at a plurality of locations would lead to multiplication of the computational effort and a complex system architecture, which is avoided in a human machine interface according to the invention. A notable advantage of the human machine interface according to the invention is that it requires only the central control unit to be interfaced with the vehicle's on-board computer and/or other devices on-board the vehicle. Signal acquisition from the on-board computer or other signal sources and filtering of the acquired signals is thus effected for all picture generation units in a centralized manner.

A human machine interface according to the present invention may implement a complete driver interface system with a centralized electronic management and processing. The central control unit, in which the computationally intensive calculations for controlling the laser drivers and the MEMS drivers are carried out, is preferably arranged in the instrument cluster area of the vehicle (i.e. in the area of the dashboard behind the steering wheel, as seen from the driver). The picture generation units are preferably distributed in different areas of the car, e.g. on the top surface of the dashboard, in the instrument cluster, the center console or in locations in the vehicle interior specifically visible by a rear-seated passenger).

As will further be appreciated, the invention enables the implementation of a head-up display not only for the driver but also for the different passengers in the car. In particular, there may be a plurality of head-up displays, each comprising a picture generation unit, each picture generation unit being preferably arranged in a different area of the dashboard.

According to a preferred embodiment of the human machine interface, each of the instrument cluster and the at least one head-up display comprises at least one picture generation unit. The picture generation unit of the instrument cluster may be complementary to conventional analog or digital display devices, such as gauges, lamps, etc. Preferably, however, the picture generation unit of the instrument cluster replaces such conventional display devices.

Preferably, the center console of the human machine interface also comprises a picture generation unit. The diffuser of each picture generation unit may have a curved surface. This will be especially appreciated with regard to the resulting design possibilities of the center console. For instance, the surface of the center console could be implemented as a touch-sensitive diffuser, the associated picture generation unit being arranged behind the diffuser for projecting thereon information-containing pictures and controls.

According to a preferred embodiment of the invention, at least one of the at least two picture generation units comprises a plurality of lasers for generating a plurality of laser beams that are modulated in time. Preferably, the plurality of lasers comprises a red, a blue and a green laser, enabling the corresponding picture generation unit to display full color (e.g. RGB) pictures. If desired, all of the picture generation units may comprise a red, a blue and a green laser.

Preferably, each picture generation unit comprises a minor sensor configured to sense an actual position and/or vibration of the micro-electromechanical minor. The processor may in this case be configured to take into account the actual position and/or vibration when calculating the Lissajous pattern and/or to diagnose a malfunction of the micro-electromechanical mirror. Each picture generation unit may also comprise a laser sensor configured to sense an actual lasing state of the at least one laser. The processor may thus be configured to take into account the actual lasing state when calculating the modulation of the at least one laser beam and/or to diagnose a malfunction of the at least one laser. As will be appreciated, the provision of a minor sensor and/or a laser sensor in each picture generation unit enables the central control unit to diagnose both high-level and low-level failures. Generally, in a vehicle, failures are detected by the measurement of a level of current intensity or a voltage. This gives an indication about a global failure of a system but not of a specific component thereof. In the case of the present invention, for each picture generation unit the amplitude and/or the frequency of each vibration mode may be detected. A laser sensor (e.g. a light detector at the output of each laser) may furthermore be provided to detect the intensity of the output light. These parameters enable the central control unit to detect if a picture generation unit is in failure mode or not (high-level diagnostic). The central control unit may furthermore detect whether the sensed parameters are relative to a real failure or to reduced performance only (low-level diagnostic). According to a preferred embodiment of the invention, each picture generation unit send the parameters relative to the functioning of its components to a PGU selection module of the central control unit, which transfer them to a diagnostic module. In case of a failure, the latter decides if the failure requires the picture generation unit to be shut down. Should that be necessary, the diagnostic module instructs the PGU selection module accordingly, which thereupon stops the failed picture generation unit and sends information about the failure to the vehicle's on-board control unit through the vehicle bus interface.

An aspect of the invention relates to an automotive vehicle that comprises a human machine interface as described herein. Such an automotive vehicle preferably comprises a dashboard and a windshield and the picture generation units of the head-up displays are preferably arranged in different areas of the dashboard for displaying information in different zones of the windshield. The picture generation units of the head-up displays may be configured for displaying information to different vehicle occupants (e.g. the driver, the front passenger and/or the passenger on a middle rear seat).

BRIEF DESCRIPTION OF DRAWINGS

Preferred embodiments of the invention will now be described, by way of example, with reference to the accompanying drawings in which.

DETAILED DESCRIPTION

Figure 1:
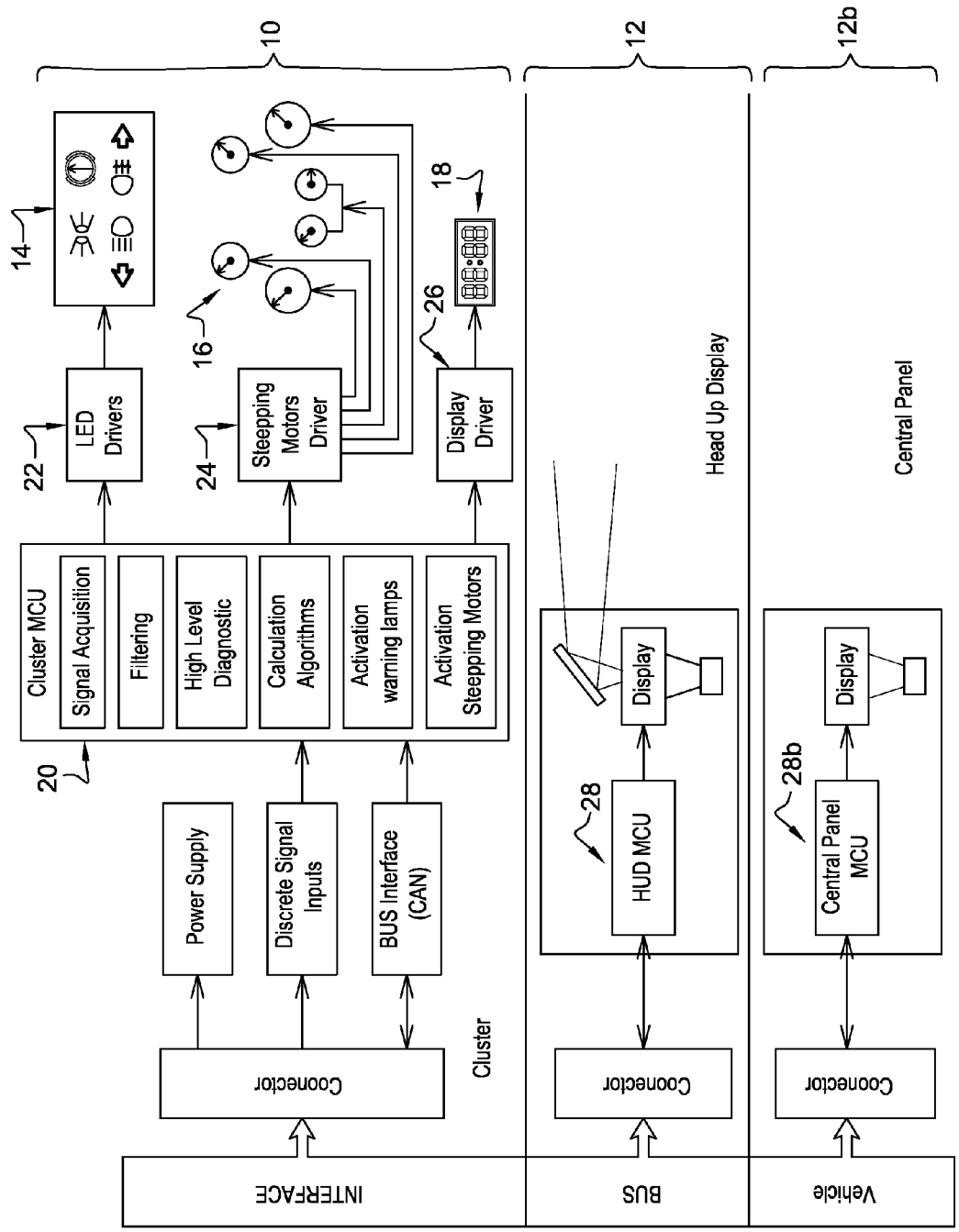
FIG. 1 is a schematic of the architecture of conventional instruments of a human machine interface in a car.

The architecture of conventional instruments used to achieve a human-machine interface in an automotive vehicle is illustrated FIG. 1. The HMI generally comprises three mutually independent instruments: an instrument cluster 10, a head-up display 12 and a center console 12b. The instrument cluster comprises a main control unit 20, warning lamps 14, analog gauges 16 and a segment LCD 18 for conveying information to a vehicle driver. The instrument cluster also includes different electronic driving circuits 22, 24 for the display devices. The main control unit 20 carries out the signal acquisition, the filtering of the signals and it computes the information to be displayed to the vehicle driver. The head up display 12 contains a similar main control unit 28. Also, the center console comprises a main control unit 28b. Each of the three instruments acquires the information to be displayed from the vehicle bus interface (Controller Area Network) and carries out calculations individually.

Figure 2:
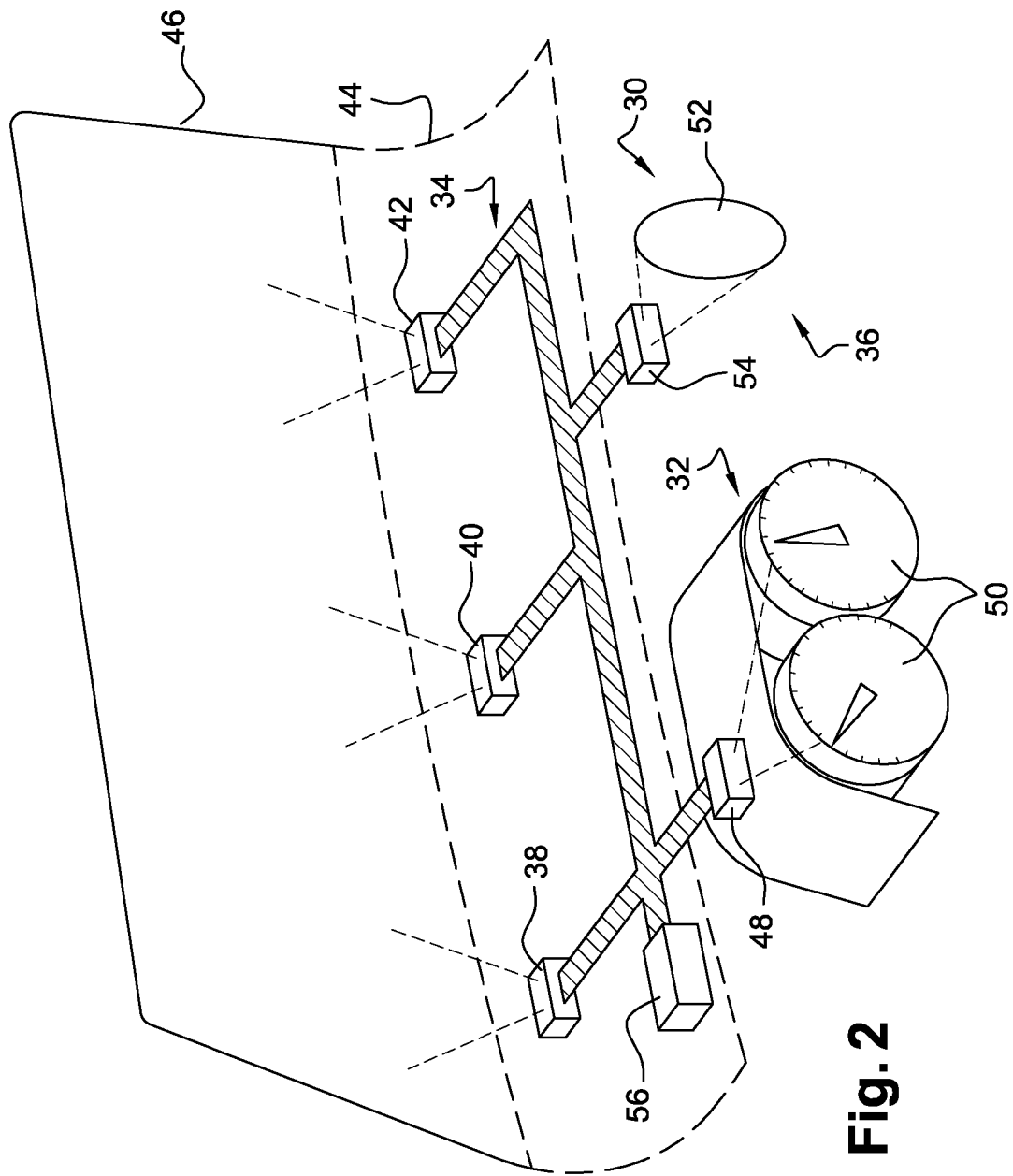
FIG. 2 is a schematic illustration of a human machine interface for a car in accordance with a preferred embodiment of the invention.

FIG. 2 illustrates a human machine interface 30 for an automotive vehicle according to a preferred embodiment of the invention. The human-machine interface comprises an instrument cluster 32, a set of head-up displays 34 and a center console 36 for displaying information to a vehicle driver and the passengers. The set of head-up displays 34 comprises a plurality of picture generation units 38, 40 and 42 arranged on the top surface of the dashboard 44. Each of the picture generation units 38, 40 and 42 is configured to project a light beam on the windshield 46 in such a way that a virtual image is generated behind (as seen from the car interior) the windshield 46, in the field of view of the respective observer. The instrument cluster 32 comprises a picture generation unit 48, which projects information to be displayed on or behind one or more screens 50 arranged behind the steering wheel (not shown in FIG. 2). The center console 36 comprises a diffusive screen 52 forming the exterior surface of the center console and a picture generation unit 54, which projects information and, possibly, control elements on the diffusive screen. Each of the picture generation units 38, 40, 42, 48, 54 includes at least one laser for generating a laser beam modulated in time and a micro-electromechanical scanning minor arranged in the optical path of the laser beam. In operation, the micro-electromechanical scanning minor is controlled in such a way as to sweep the laser beam over a diffuser in a two-dimensional Lissajous pattern. The combination of the modulated laser beam and the sweeping motion of the spot of the laser beam on the diffuser results in a two-dimensional picture.

Figure 3:
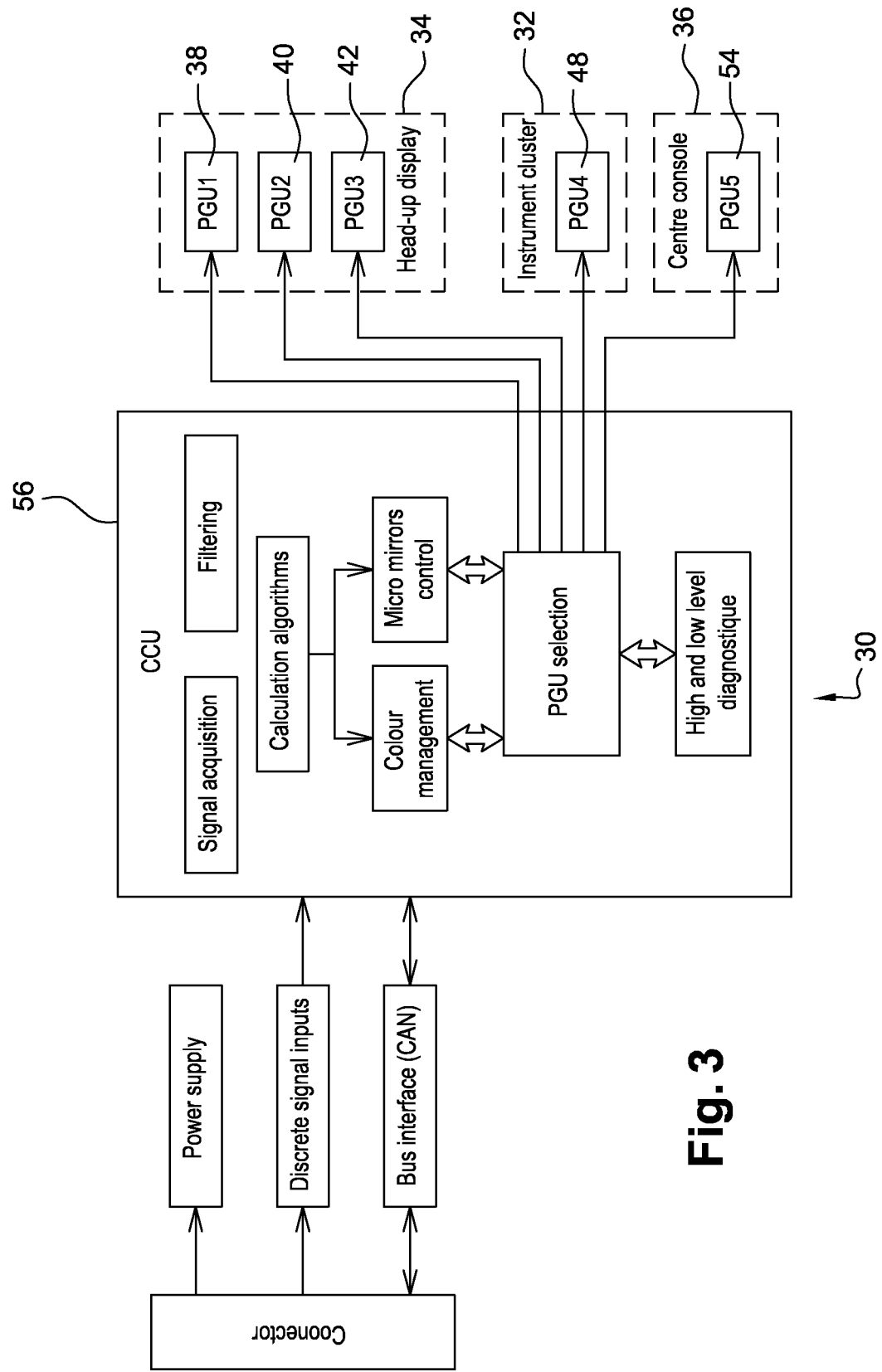
FIG. 3 is a schematic of the architecture of the human machine interface of FIG. 2.

As shown in FIG. 3, each of the picture generation units 38, 40, 42, 48, 54 is operatively connected to a central control unit 56, which is interfaced with a vehicle's on-board computer through a vehicle interface bus or a LVDS (Low Voltage Differential Signaling) video interface for receiving information to be displayed in form of a picture. The central control unit 56 comprises a processor configured to determine the pictures to be generated by the at least two picture generation units based on the information received and to calculate, for each picture generation unit 38, 40, 42, 48, 54, the Lissajous pattern created by the two vibrational modes of the micromirror and the modulation of the laser beam, the combination of which results in the respective picture to be displayed.

FIG. 3 schematically shows the architecture of the human-machine interface 30 of FIG. 2. The central control unit 56 is interfaced with the vehicle's CAN bus, via which it receives information relating to the vehicle. The central control unit 56 carries out the signal acquisition, the filtering of the signals and it includes a processor that computes the information to be displayed to the vehicle driver. The processor performs all the graphics calculations in relation with the pictures to be displayed to the driver and the passengers; specifically, it also contains a PGU selection module and a diagnostic module.

Figure 4:
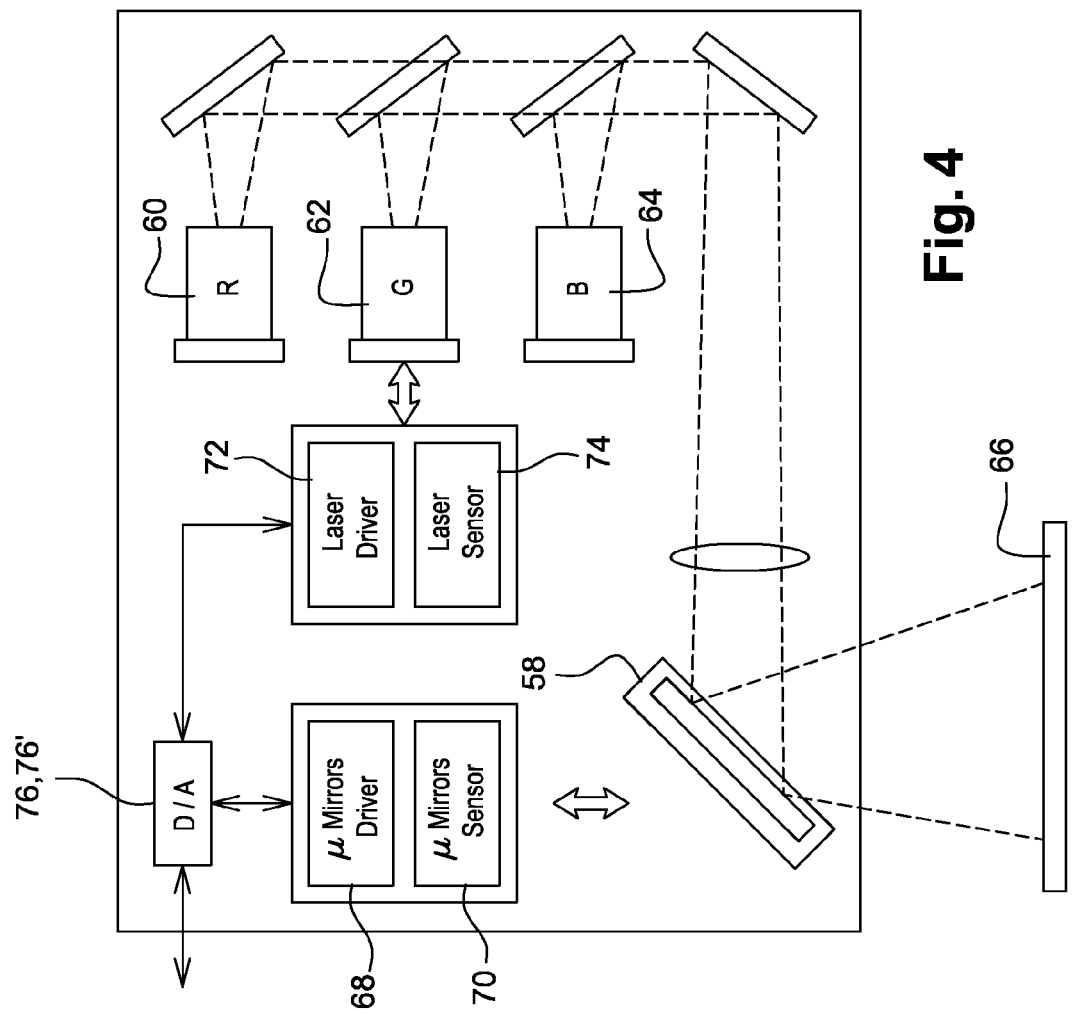
FIG. 4 is a block diagram of an example of a picture generation unit for use in the context of the invention.

The preferred architecture of a picture generation unit 38, 40, 42, 48 or 54 is shown in FIG. 4. The picture generation unit comprises a micro-electromechanical minor 58, which oscillates at different vibrational modes, each vibrational mode with respect to a specific axis. The micro-electromechanical minor 58 is arranged in the optical path of a red, a green and a blue laser beam produced by a red 60, a green 62 and a blue 64 laser, respectively. The micro-electromechanical mirror 58 deviates the laser beams onto a diffuser 66, on which a picture resulting from the combination of the minor oscillations and the modulations of the laser beams is generated. The micro-electromechanical minor 58 is controlled by a micro-minor driver 68. A micro-mirror sensor 70 senses the vibrations of the micro-mechanical mirror in order to provide a feedback to the processor. The lasers 60, 62, 64 are controlled by one or more laser drivers 72. One or more laser sensors 74 monitor the modulations of the laser beams and return corresponding signals to the processor of the central control unit 56.

Figure 5:
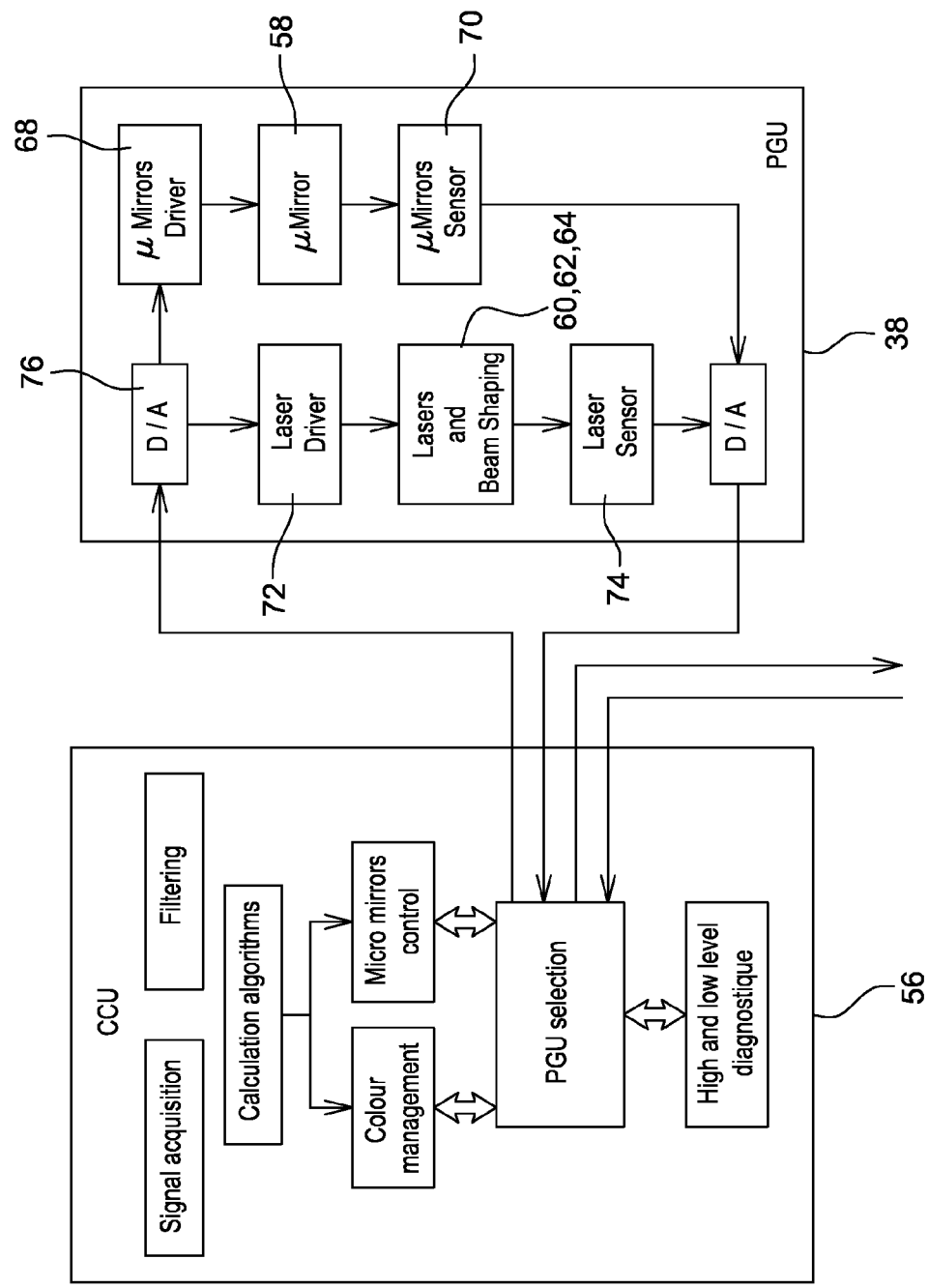
FIG. 5 is an illustration of the interaction of the central control unit and a picture generation unit in the preferred embodiment of FIG. 2.

FIG. 5 schematically illustrates the interaction between the central control unit 56 and one of the picture generation units 38, 40, 42, 48, 54, e.g. picture generation unit 38. Based on the type of information to be displayed by the picture generation unit 38 (e.g. vehicle speed, fuel level, distance to leading vehicle, etc., possibly selectable by the driver), the central control unit determines the picture to be displayed (containing the information) and computes the relevant parameters of the micro-mirror vibrations (micro-mirror control module) and of the laser beam modulations (color management module). The corresponding data are dispatched to the picture generation unit 38, where they are received by a digital-to-analog converter 76 and forwarded as analog signals to the micro-minor driver 68 and to the laser driver(s) 72, respectively. The response of the hardware (i.e. the laser(s) and the micro-mechanical mirror) is monitored by a micro-mirror sensor 70 and a laser sensor 74. The output signals of the micro-mirror sensor 70 and the laser sensor 74 are converted into digital signals by an analog-to-digital converter 76' and transmitted to the central control unit 56. The processor of the central control unit is configured to monitor the signals received from the micro-mirror sensor 70 and the laser sensor 74 in order to detect any fault or malfunction (high and low level diagnostics module).

It will be appreciated that the central control unit performs substantially the same tasks for each of the picture generation units 38, 40, 42, 48, 54. However, the information to be displayed and thus the pictures to be generated may vary from one picture generation unit to another. The central control unit thus calculates the control parameters for each picture generation unit separately. The calculations (control signals and diagnostics) relating to the different picture generation units may be carried out in parallel or in serial manner. The processor may implement a scheduler (PGU selection module) to coordinate the calculations, the dispatching of data to the different picture generation units and the reception of data from the different picture generation units.

The role of the PGU selection module is to distribute the necessary information to each of the picture generation units, by respecting specific timing cycles related to the PGU components. It also distributes the data emanating from each picture generation unit to a specific module of the central control unit.

In the following, n designates the number of picture generation units and the required resolution of the image is p·q. Image generation is achieved as follows: during one image frame, the scanning mirror of each picture generation unit is illuminated for all its pixels at least n times (in other words, the image area is scanned by the laser beam). The observer has the impression of a steady image because of the synchronization between the mirror oscillations and the lasers.

The necessary time for one image frame is assumed to be 1/v; during this time interval each picture generation unit generates the picture m times, m being selected such that the individual pictures are not discernable by the human eye.

In case of a single picture generation unit, the overall time available for the laser beam of a picture generation unit to illuminate one virtual pixel during an image frame can be calculated by Eq. 1.

$$\tau k = 1/(v*p*q) \qquad \text{Eq. 1}$$

As there are n picture generation units, the overall available time for illumination of a pixel during an image frame can be calculated by Eq. 2.

$$\tau int = 1/(n*v*p*q) \qquad \text{Eq. 2}$$

As the full image area is scanned m times during one image frame, one obtains, as the duration of an individual illumination of one pixel can be calculated by Eq. 3.

$$\tau min = 1/(n*m*v*p*q) \qquad \text{Eq. 3}$$

It follows that for each picture generation unit, the microminor has to vibrate at a frequency at least equal to 1/τmin.

For each interval of time of the illumination of a pixel, the color management module determines the appropriate power levels for each color (R, G and B) in order to insure that the mixing thereof will give the requested mixed color and transmits the corresponding data to the picture generation unit. During each time interval, the PGU selection module sends the dedicated image contents to the dedicated picture generation unit.

As an example, one may consider the five picture generation units of FIG. 3 and the information to be displayed by each of them as in Table 1 below.

TABLE 1

|      | Speed | HB | LB | TL_L | TL_R | Fuel | rpm | GPS | Radio | AC |
|------|-------|----|----|------|------|------|-----|-----|-------|-----|
| PGU1 | X     |    |    |      |      | X    | X   |     |       |    |
| PGU2 | X     |    |    |      |      | X    |     | X   |       |    |
| PGU3 | X     |    |    |      |      |      |     | X   |       |    |
| PGU4 | X     | X  | X  | X    | X    | X    |     | X   |       |    |
| PGU5 |       |    |    |      |      |      |     |     | X     | X  |

(where: Speed=speed information, HB=high beam indicator, LB=low beam indicator, TL_L=direction indicator (left), TL_R=direction indicator (right), Fuel=fuel indicator, rpm=engine speed, GPS=GPS information, AC=air conditioning information). The processor receives the relevant information from the CAN bus or the vehicle's onboard control unit and computes corresponding pictures for each picture generation unit. The data relating to these pictures are then distributed to the different picture generation units in the different time slots. The pictures for one particular picture generation unit are calculated at the frequency v; i.e. a new picture is calculated after each time interval of duration 1/v. Within one image frame, each picture is transmitted m times to the respective picture generation unit. Each sub-image (one of the m copies of each picture) lasts 1/(n*m*v).

Figure 6:
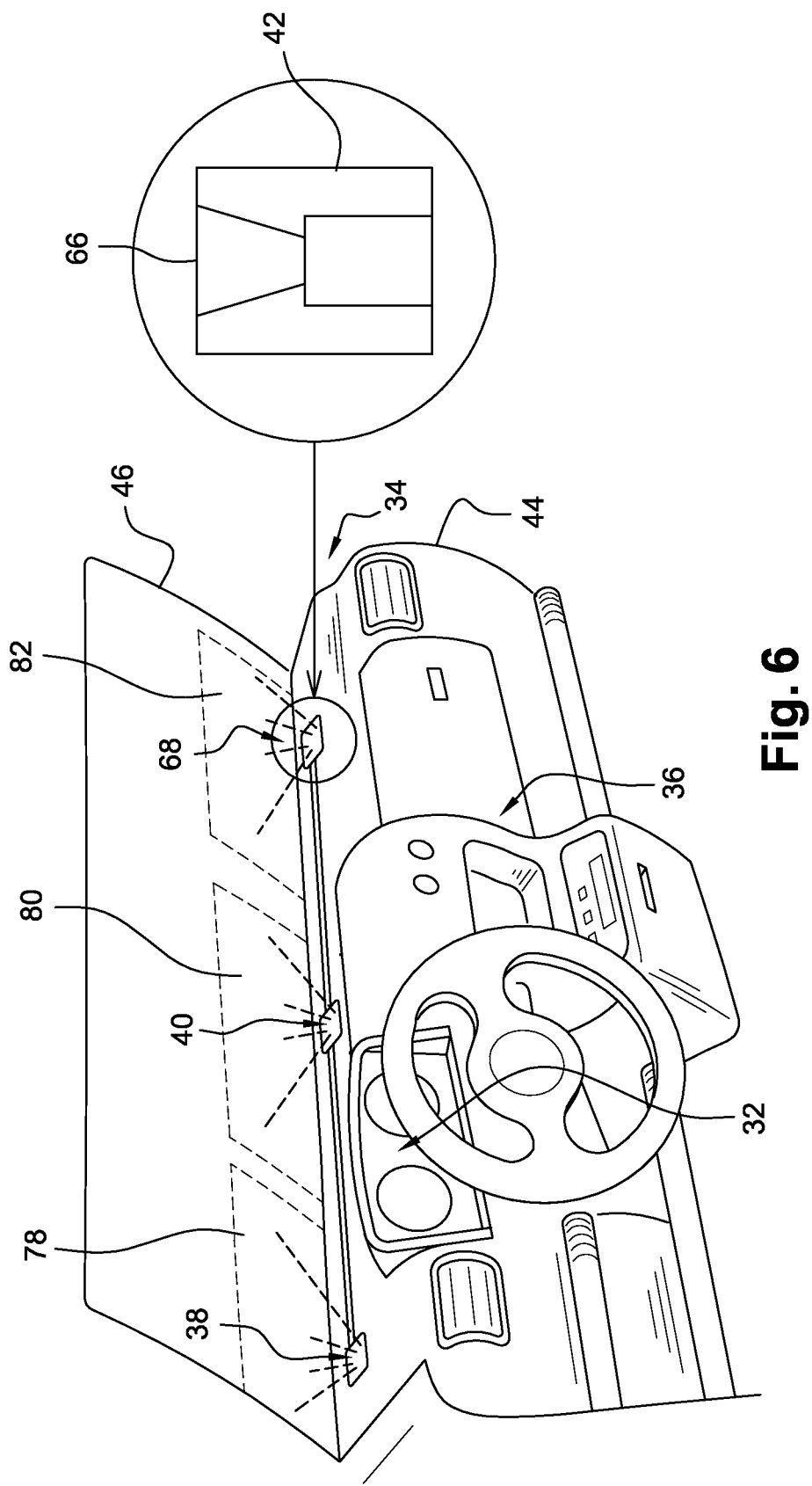
FIG. 6 is an illustration of a car dashboard comprising a plurality of head-up displays, each of which comprises a display area for displaying information to a different car occupant.
Figure 7:
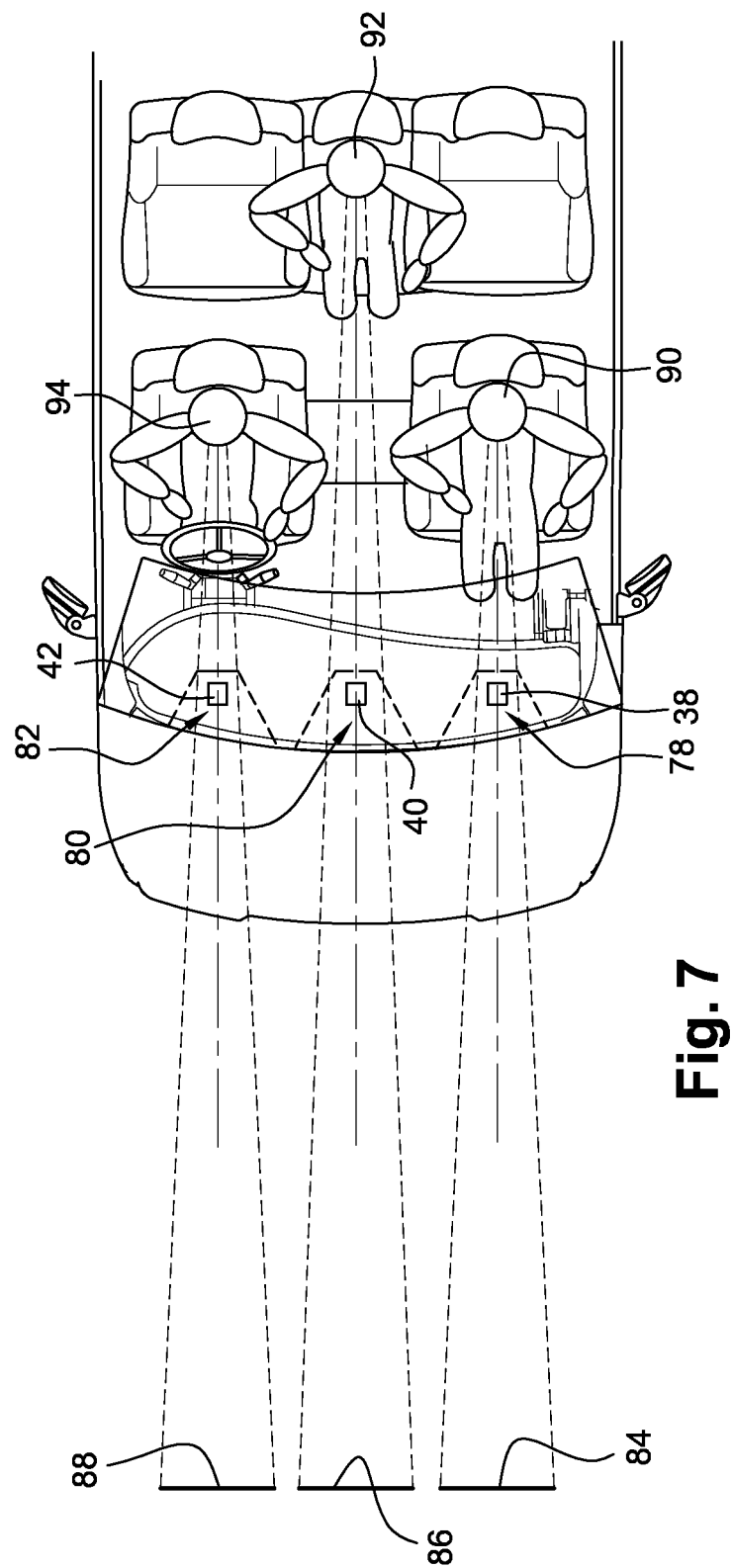
FIG. 7 is a top view of a car interior with a dashboard as in FIG. 6.

FIGS. 6 and 7 show a dashboard equipped with a set of head-up displays 34, each of the headup displays comprising an individual display area 78, 80 and 82 for displaying information to a different car occupant. The picture to be displayed in each display area 78, 80, 82 is produced by a picture generation unit 38, 40, 42 described previously (see FIGS. 4 and 5). Thanks to the fact that the graphical calculations are carried out by a central control unit, the individual picture generation units may be realized as very compact devices that may be easily integrated into a car dashboard. As illustrated in the insert in FIG. 6, the picture generation unit of each head-up display comprises a diffuser plate 66, on which a real image is formed. The combiner (which may be arranged on the windshield or in front thereof) reflects the light into the direction of the respective observer. As a consequence, the observers see the displayed information as a virtual image 84, 86, 88 behind the combiner. The dispersion properties of the diffuser and the reflection or diffraction properties of the combiners are preferably chosen such that each virtual image can only be seen from a relatively narrow solid angle centered on the position of the eyes of the respective observer. Each image can thus only be seen from a specific direction, which permits to avoid, for instance, that the driver 90 is distracted by the pictures displayed to the passengers 92, 94.

Figure 8:
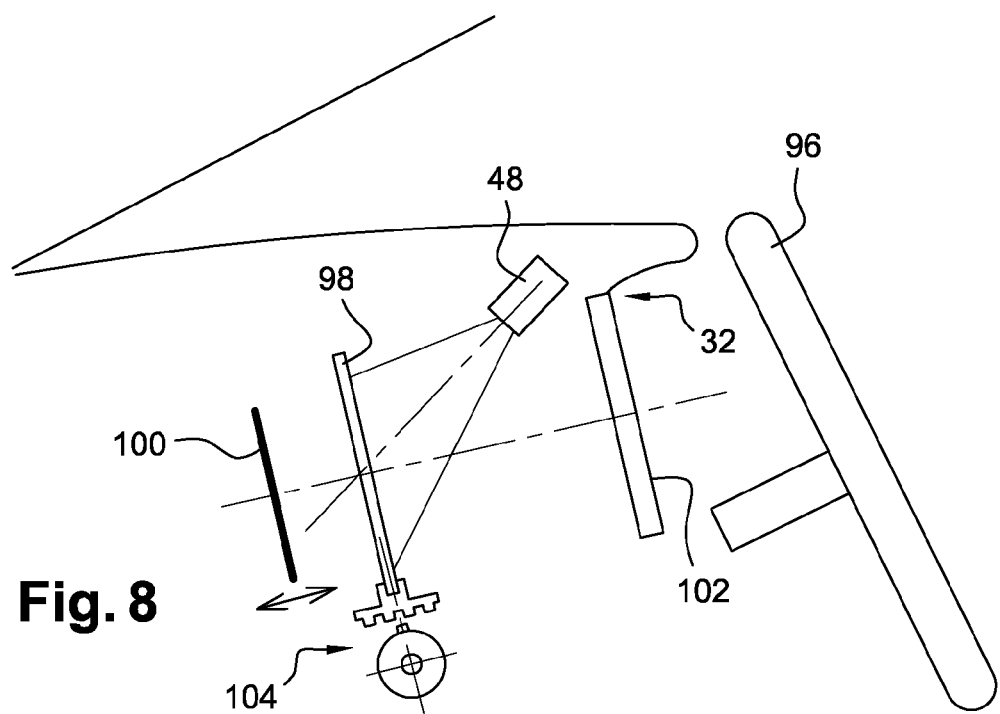
FIG. 8 is a schematic diagram of an instrument cluster comprising a micro-mirror based picture generation unit.

FIG. 8 shows a preferred embodiment of an instrument cluster for use in a human machine interface in accordance with the invention. According to the illustrated embodiment, the instrument cluster information is displayed to the driver as an in-depth projection, i.e. the cluster information is not projected on a diffuser screen on the surface of the dashboard directly behind the steering wheel 96 but at a certain distance from the steering wheel. A first advantage of this arrangement is that the position of the displayed picture may be adapted to the position of the driver's eyes. The instrument cluster 32 comprises a picture generation unit 48 (including a diffuser on which a real image of the picture to be displayed is generated) and an optical element 98 (e.g. a hologram or diffractive grating), which diffracts the light beam from the picture generation unit 48 to create a virtual image 100. The driver sees the picture behind the window 102 as a virtual image 100 of the image. The position (axial position and/or inclination) of the optical element 98 may be adjusted using an adjustment mechanism generally indicated at 104. By changing the position of the optical element 98, the driver may adjust the position of the virtual image 100. A more simplified version of the instrument cluster may be achieved by replacing the optical element 98 by a diffuser. In this case, the image is displayed in the plane of such diffuser.

Figure 9:
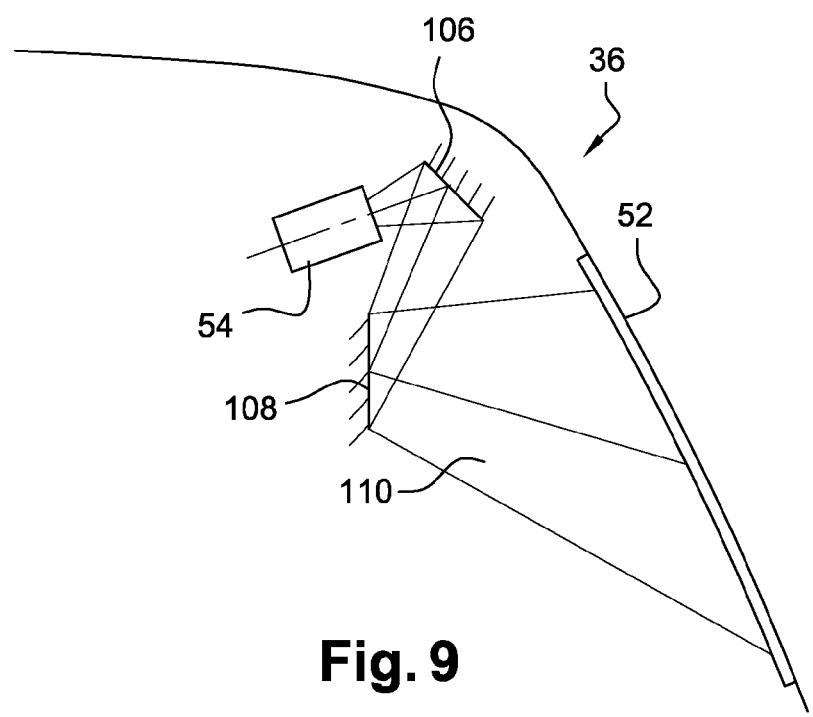
FIG. 9 is a schematic cross section of a center console comprising a micro-minor based picture generation unit.

A preferred embodiment of center console for use in a human machine interface in accordance with the invention is shown in FIG. 9. The center console comprises a diffuser screen 52, which is illuminated from behind by a picture generation unit 54. Mirrors 106, 108 may be provided to widen the light beam 110 emanating from the picture generation unit 54 in such a way that it covers the entire area of the diffuser screen 52. As will be appreciated, the diffuser screen 52 may have a curved surface, which opens a range of design possibilities that was inaccessible with display technology previously available on the market.

While specific embodiments of the invention have been described in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. A human machine interface for an automotive vehicle comprising:
   an instrument cluster and at least one head-up display for displaying information to a vehicle driver; wherein said instrument cluster and said at least one head-up display comprise at least two picture generation units, each picture generation unit including:
   at least one laser for generating at least one laser beam that is modulated in time;
   a micro-electromechanical minor arranged in the optical path of said laser beam, for sweeping said laser beam over a diffuser in a two-dimensional Lissajous pattern;
   each picture generation unit configured to generate on said diffuser a picture resulting from the combination of the modulation of said at least one laser beam in time and said two-dimensional Lissajous pattern;
   and wherein said human machine interface comprises a central control unit interfaced with a vehicle's on-board computer and one or more devices on-board the vehicle for receiving information to be displayed in form of a picture, the central control unit including:
   a processor operatively connected with said at least two picture generation units, said processor being configured to determine pictures to be generated by said at least two picture generation units that contain said information to be displayed, and to calculate in a centralized manner, for each picture generation unit, a two-dimensional Lissajous pattern and a modulation of said at least one laser beam, the combination of which results in the respective picture to be displayed, wherein each of said at least two picture generation units comprises a mirror sensor configured to sense an actual position and vibration of said micro-electromechanical mirror, and wherein said processor is configured to take into account said actual position and vibration when calculating said Lissajous pattern and to diagnose a malfunction of said micro-electromechanical mirror.

2. The human machine interface as claimed in claim 1, wherein each of said instrument cluster and said at least one head-up display comprises at least one picture generation unit.

3. The human machine interface as claimed in claim 1, comprising a center console, said center console comprising a picture generation unit.

4. The human machine interface as claimed in claim 1, wherein at least one of said at least two picture generation units comprises a plurality of lasers for generating a plurality of laser beam that are modulated in time.

5. The human machine interface as claimed in claim 4, wherein said at least one of said at least two picture generation units comprises a red, a blue and a green laser.

6. The human machine interface as claimed in claim 1, wherein each of said at least two picture generation units comprises a laser sensor configured to sense an actual lasing state of said at least one laser, and wherein said processor is configured to take into account said actual lasing state when calculating said modulation of said at least one laser beam and to diagnose a malfunction of said at least one laser.

7. The human machine interface as claimed in claim 1, wherein said at least one head-up display is a plurality of head-up displays and wherein each of said plurality of head-up displays comprises a picture generation unit.

8. An automotive vehicle, comprising a human machine interface as claimed in claim 1.

9. The automotive vehicle as claimed in claim 8, wherein said automotive vehicle comprises a dashboard and a windshield and wherein said picture generation units of said plurality of head-up displays are arranged in different areas of said dashboard for displaying information in different zones of said windshield.

10. The automotive vehicle as claimed in claim 9, wherein said picture generation units of said head-up displays are configured for displaying information to different vehicle occupants.

* * * * *